United States Patent [19]

Bounie et al.

[11] Patent Number: 4,828,294

[45] Date of Patent: * May 9, 1989

[54] THREADED JOINT FOR STEEL PIPES CONTAINING A SEALING DEVICE LOCATED AT THE LEVEL OF THE THREADING

[75] Inventors: Paul Bounie, Aulnoye/Aymeries; Bernard Plaquin, Aulnoye, both of France

[73] Assignee: Vallourec, Paris, France

[*] Notice: The portion of the term of this patent subsequent to May 9, 2006 has been disclaimed.

[21] Appl. No.: 57,060

[22] PCT Filed: Sep. 12, 1986

[86] PCT No.: PCT/FR86/00305

§ 371 Date: May 6, 1987

§ 102(e) Date: May 6, 1987

[87] PCT Pub. No.: WO87/01787

PCT Pub. Date: Mar. 26, 1987

[30] Foreign Application Priority Data

Sep. 12, 1985 [FR] France .................. 85 13537

[51] Int. Cl.⁴ .................. F16L 15/04; E21B 17/042
[52] U.S. Cl. .................. 285/334; 285/332.3; 285/355; 264/162; 264/262
[58] Field of Search .................. 285/333, 334, 332.2, 285/332.3, 355, 294, 297; 29/525, 458; 264/162, 138, 242, 262

[56] References Cited

U.S. PATENT DOCUMENTS

| | | | |
|---|---|---|---|
| 1,474,375 | 11/1923 | Moore | 285/355 |
| 1,946,619 | 2/1934 | Furman et al. | 264/262 |
| 2,086,133 | 7/1937 | Kennedy | 285/297 |
| 2,177,100 | 10/1939 | Frame . | |
| 2,380,690 | 7/1945 | Graham | 285/333 |
| 2,631,871 | 3/1953 | Stone | 285/146 |
| 2,671,949 | 3/1954 | Welton | 29/446 |
| 2,756,479 | 7/1956 | Garneau . | |
| 2,760,585 | 8/1956 | Bergeron . | |
| 3,047,316 | 7/1962 | Wehring et al. | 285/334 |
| 3,101,207 | 8/1963 | Pavel . | |
| 3,339,003 | 8/1967 | Cessna | 29/458 |
| 3,391,101 | 7/1968 | Kelly et al. | 285/294 |
| 3,850,461 | 11/1974 | Fujioka et al. | 285/322.2 |
| 4,153,656 | 5/1979 | Bunyan . | |
| 4,226,444 | 10/1980 | Bunyan | 285/294 |
| 4,473,245 | 9/1984 | Raulins et al. | 285/334 |
| 4,489,963 | 12/1984 | Raulins et al. | 285/334 |
| 4,508,326 | 4/1985 | Andre | 269/22 |
| 4,629,223 | 12/1986 | Dearden et al. . | |
| 4,639,849 | 12/1986 | Fukui et al. . | |

FOREIGN PATENT DOCUMENTS

| | | |
|---|---|---|
| 178231 | 4/1986 | European Pat. Off. . |
| 3243340 | 5/1984 | Fed. Rep. of Germany . |
| 2201741 | 4/1974 | France . |
| 2524962 | 10/1983 | France . |
| 121226 | 10/1978 | Japan . |
| 557499 | 12/1974 | Switzerland . |
| 2064041 | 6/1981 | United Kingdom . |

Primary Examiner—Thomas F. Callaghan
Assistant Examiner—Anthony Knight
Attorney, Agent, or Firm—Arnold, White & Durkee

[57] ABSTRACT

A threaded joint for steel pipes useable in particular for the petroleum industry is provided. The joint is formed by threaded male and female elements wherein one part of the thread of a first element is strongly applied against the thread of the other element. One of the elements contains a groove having a length of at least one thread pitch and a depth greater than the height of the threads. A sealing device is provided in the groove consisting of a synthetic lining whose volume and shape essentially correspond to the volume and shape of the play that would exist between the threads of the elements.

9 Claims, 3 Drawing Sheets

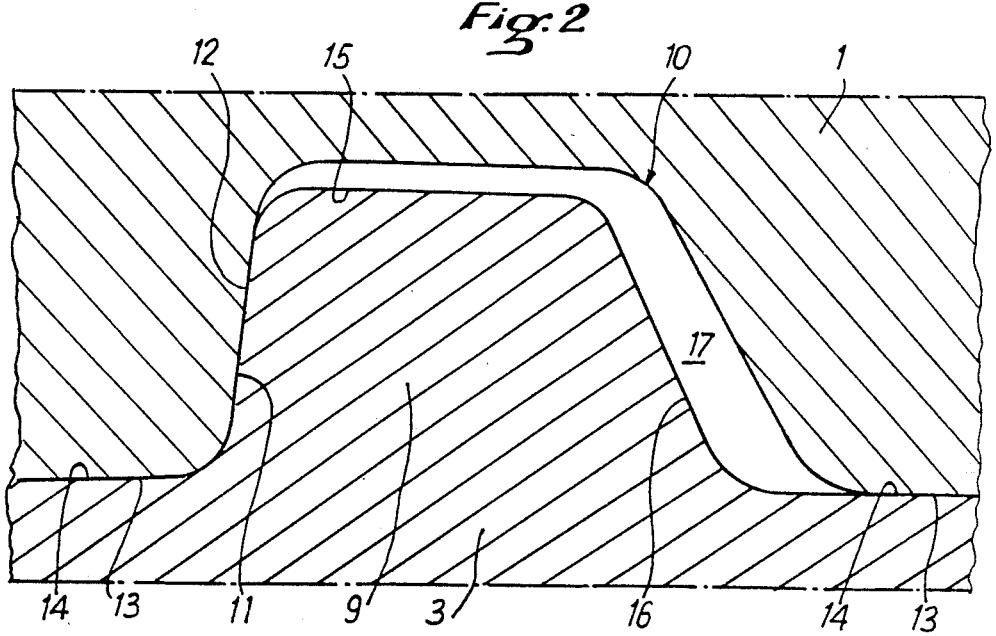
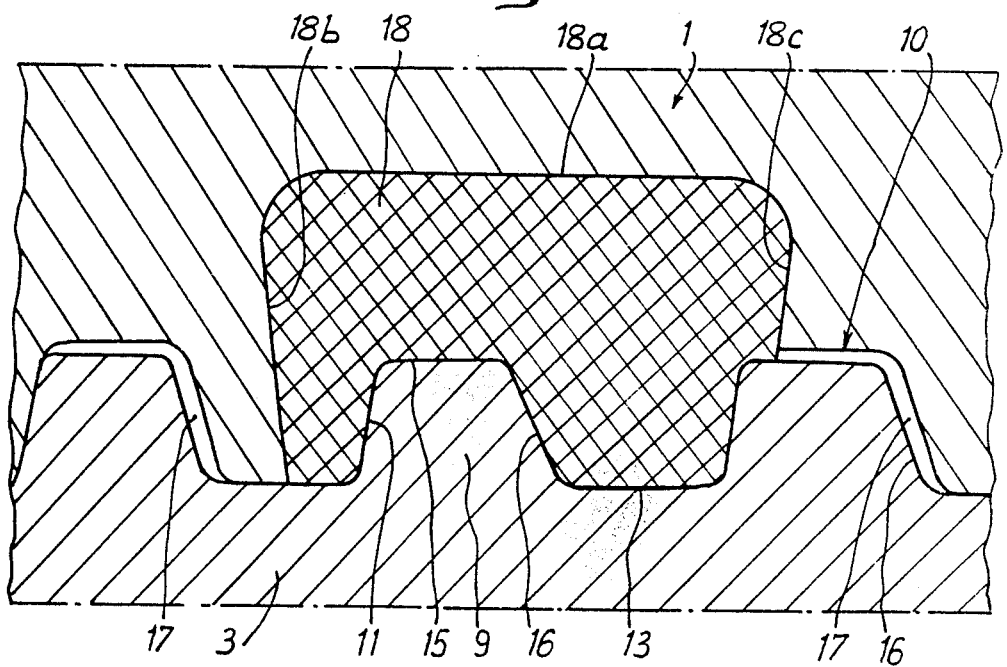

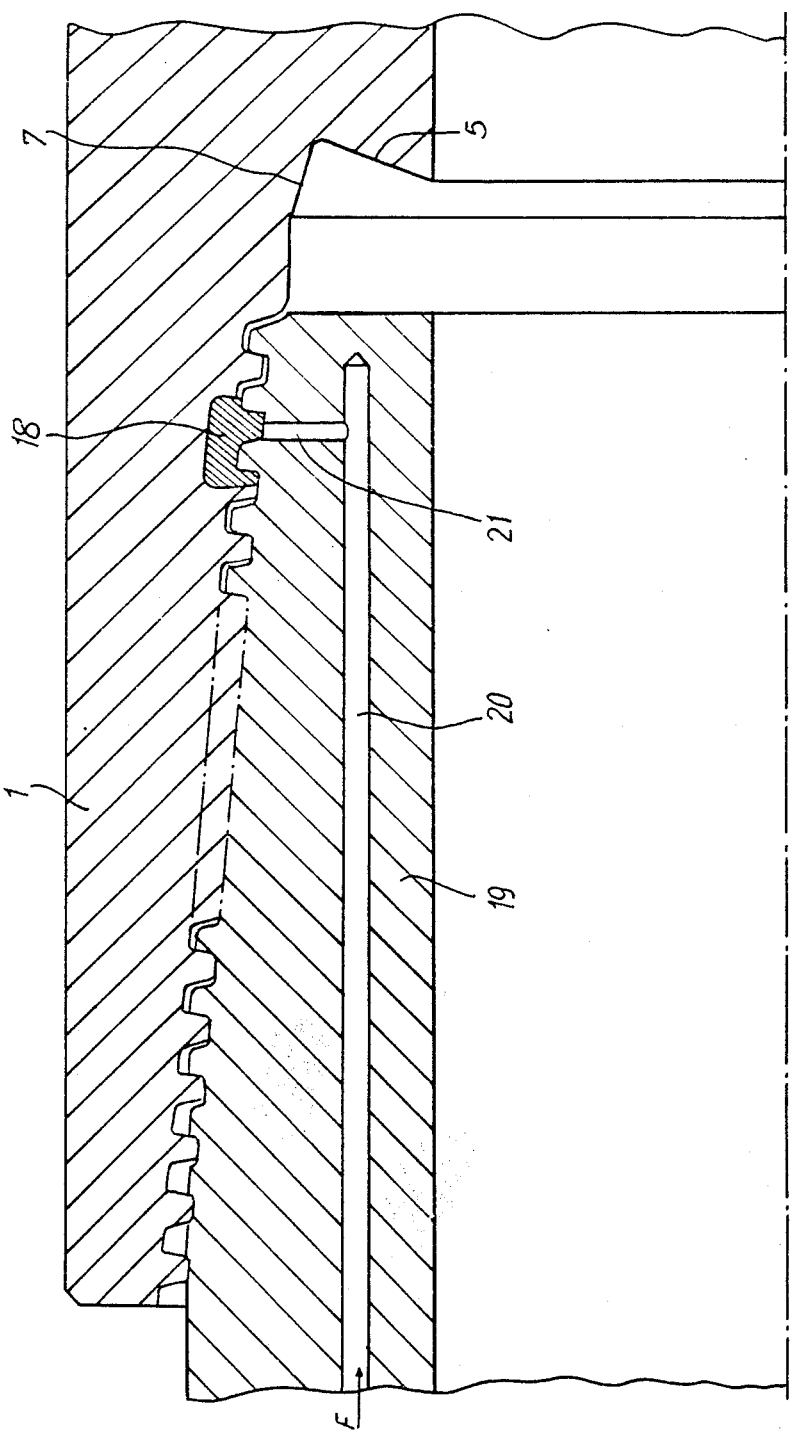

THREADED JOINT FOR STEEL PIPES CONTAINING A SEALING DEVICE LOCATED AT THE LEVEL OF THE THREADING

BACKGROUND

The present invention concerns a thread joint for steel pipes, usable in particular in the petroleum industry, which comprises a sealing device located at the level of the threadings.

It is known that joints for pipes used in the petroleum industry must present a certain number of characteristics that are difficult to reconcile and which consist in particular of the fact that the joint while being easy to machine and not very sensitive to damage, permits ensurance of perfect sealing with respect to very strong pressures that are exerted either on the inside or outside of the joint, even under the hypothesis where the joint is subjected to bending or substantial tension or axial compression.

It is also necessary that the elements of the joint be interchangeable without having an unfavorable effect on the quality of sealing obtained during new screwing of the joint with other elements. The threaded joints now used in the petroleum industry mostly comprise male and female threadings that are most often conical (but which can also be cylindrical) and which ensure mechanical maintenance of the two elements of the pipe, one within other, essentially supporting the axial tensions exerted on the joint.

In most cases the known joints also comprise so-called screw stops whose purpose is to immobilize the male element relative to the female element as soon as the prescribed tightening torque has been reached.

Finally, the joints of this type also contain at least one pair of sealing surfaces that are placed so that during tightening of the joint these sealing surfaces come in contact with each by being applied to each other by a sufficient pressure to obtain sealing.

In most cases this is achieved by contact of the metal-metal type, but in certain cases the sealing surfaces can be associated with joints made of plastic, such as PTFE rings which by deformation ensure or contribute to sealing of the joint.

It is known in particular that such annular joints, for example, made of PTFE, can be placed in a groove made on the female element, or at the level of the sealing surfaces, or even at the level of the threadings so that during tightening of the joint the male element causes plastic deformation of the joint which loses its initial shape and adapts itself to the shape of the male element.

Such plastic joints, however, present the drawback of being difficult to emplace and in practice require changing each time the joint is disassembled and then reassembled.

Such joints consisting of plastic rings that are simply positioned in a groove made in the female element must in effect be very strongly deformed in order for the male element to inlay its threadings.

In practice this causes destruction of the plastic joint, which is thus unusable for later installation of joint elements. Moreover, the substantial stresses imposed on the plastic joint during this deformation often cause displacement of the plastic ring which is thus extracted from the groove and no longer functions in its role.

It is also known, in particular for achieving sealing of screwed joints intended to supply buildings with water or central heat, that there is a technique consisting of covering the threading of one of the elements by means of a thermoplastic material that is deformed during screwing to ensure tightness.

These sealing devices are intended to replace the use of flax or PTFE strip which are conventionally wound onto the threading of the male element before screwing into the female element. These sealing device seek to preposition a thermoplastic material at the level of the threading of these elements.

In this case as well it is generally not possible to lossen the joint, to retighten it by interchanging the elements, preserving the quality of tightness required.

The present invention seeks to impart to joints for steel pipes, intended particularly for the petroleum industry, satisfactory sealing at the level of the threadings, the sealing being achieved by a plastic element whichis an integral part of one of the elements of the joint, which can be reused reliably during subsequent tightenings of this element.

It is known that in order to permit its original function, which is to mechanically connect the two elements of the pipes, each thread of the male element must be applied to a corresponding thread of the female element necessarily in the axial direction and most often (in the case of truncated threadings) in the radial direction as well.

It follows that one can break down the contour of the threads of one joint in the clamped condition, on the one hand, into surfaces that are strongly applied to each other during screwing of the joint, and on the other hand, into surfaces of the male element and female element that are opposite each other at a certain distance from each and between which the play existing in the threading is located.

It follows from the existence of this part of the contour of the threadings where the surfaces ofthe male and female elements are separated from each other, that to date it has not been possible in practice to achieve satisfactory sealing at the level of the threadings of this type of joint.

In effect, the existence of this play between the corresponding surfaces of the male threading and female threading creates a leakage path with essentially helicoidal shape along the threadings, which opposes any sealing at this level.

The present invention is based on the achievement of sealing which is located along this helicoidal leakage path which can thus be blocked effectively and repeatedly.

SUMMARY OF THE INVENTION

The object of the present invention is a threaded joint for steel pipes used in particular for the petroleum industry, of the type in which the male element and the female element are connected by threadings, whereas one part of the surface of the contour of each thread is strongly applied in the tightened condition to the threading of the other element, characterized by the fact that at least one of the elements of the joint contains over an axial distance corresponding to the length of at least one thread pitch, at least one groove whose depth is greater than the height of the threads, said groove or grooves being equipped with a lining made of a synthetic material whose volume and shape correspond at least to the volume and shape of the plat that would exist in the tightened condition between this element of the joint and the other element of the joint whose dimensions will be at the limit of machining tolerances that permits the greatest possible play of the joint in the installed condition.

One understands that under these conditions the joint according to the invention consists of a first joint element that is provided with at least one groove filled with a synthetic lining made to conform before screwing and whose external shape is strictly complementary to the shape of the contour of the threads of the other element after screwing (accounting for the compressions that can occur during tightening of the joint), and a second conventional element that is totally metallic or also contains at least one groove provided with a lining like the first element.

One also understands that in such a joint the helicoidal leakage path whose existence was mentioned above is interrupted in sealed fashin at the level of the groove or grooves, because of the fact that when the joint is tightened, the synthetic lining is elastically supported on the entire periphery of the threading of the element.

Because of the fact that the mass of synthetic material in the groove or grooves has not been shaped during tightening to adapt to the shape of the threading of the other element, this synthetic material simply undergoes slight compression, but is not subjected to deterioration and does not have to be replaced with each tightening, as was previously the case when one positioned rings made of a synthetic material, for example PTFE, in the grooves machined in the female element.

Moreover, this synthetic material, by adhering strongly to the walls of the groove or grooves, does not risk being accidentally removed.

According to the invention, the groove or grooves made in at least one of the elements at the level of the threading advantageously presents a dovetail so as to avoid a situation where the lining made of a synthetic material will have a tendency to be detached from the groove where it is housed under the influence of stresses communicated during tightening of the other element.

In a preferred version, comprising a single groove that receives the synthetic lining, this is achieved on the female element in the vicinity of the end of the threading which is located next to the end of the male element.

However, such a groove can also be made at another point of the threading of the female element or even at any point of the threading of the male element, without departing from the scope of the present invention.

The synthetic lining that is contained in the groove or grooves made in at least one of the elements can be obtained by various processes.

Accoring to a first process of the invention one screws onto or into the element containing the groove or grooves a mandrel containing a threading whose dimensions correspond to the minimal tolerance limits of the joint element that must be tightened in or on the element that contains a groove or grooves, or whose dimensions are slightly less than these minimal limits, when one desires to systematically obtain compression of the plastic linings, and by means of a number of channels arranged in the mandrel one injects at the level of the groove or grooves the synthetic material which, adhering to the surface of the groove after polymerization, thus produces a synthetic lining according to the invention, which is integral with the considered joint element.

As a variant, one can use a mandrel devoid of channels which is screwed into or onto the element containing the groove or grooves after having applied in it a sufficient mass of synthetic material.

According to another process of the invention one applies in the groove or grooves made in one of the joint elements a sufficient mass of synthetic material in which one causes polymerization, whereupon this synthetic material is machined to impart to it a shape which, considering the compression one wishes to achieve, exactly corresponds to the contour of the threading of the other element in which the dimensions correspond to the minimal manufacturing tolerances for this other element.

According to this invention, it is advantageous to use as synthetic material urethane elastomers such as "Polathane XPE or RIM 160" with a microcellular structure, polycarbonates, polyolefins or polyamides.

BRIEF DESCRIPTION OF THE DRAWINGS

For purposes of better understanding of the invention several versions shown in the accompanying drawings will now be described as illustrations that are in no way limiting. In the accompanying drawing:

FIG. 2 is a cross section on a larger scale along II of FIG. 1 showing the play that exists at the level of the threadings outside of synthetic linings according to the invention.

FIG. 3 is a cross section on a larger scale of part III of FIG. 1.

FIG. 4 is a schematic cross section showing a version of the synthetic lining according to the invention.

DETAILED DESCRIPTION

Figure 1:
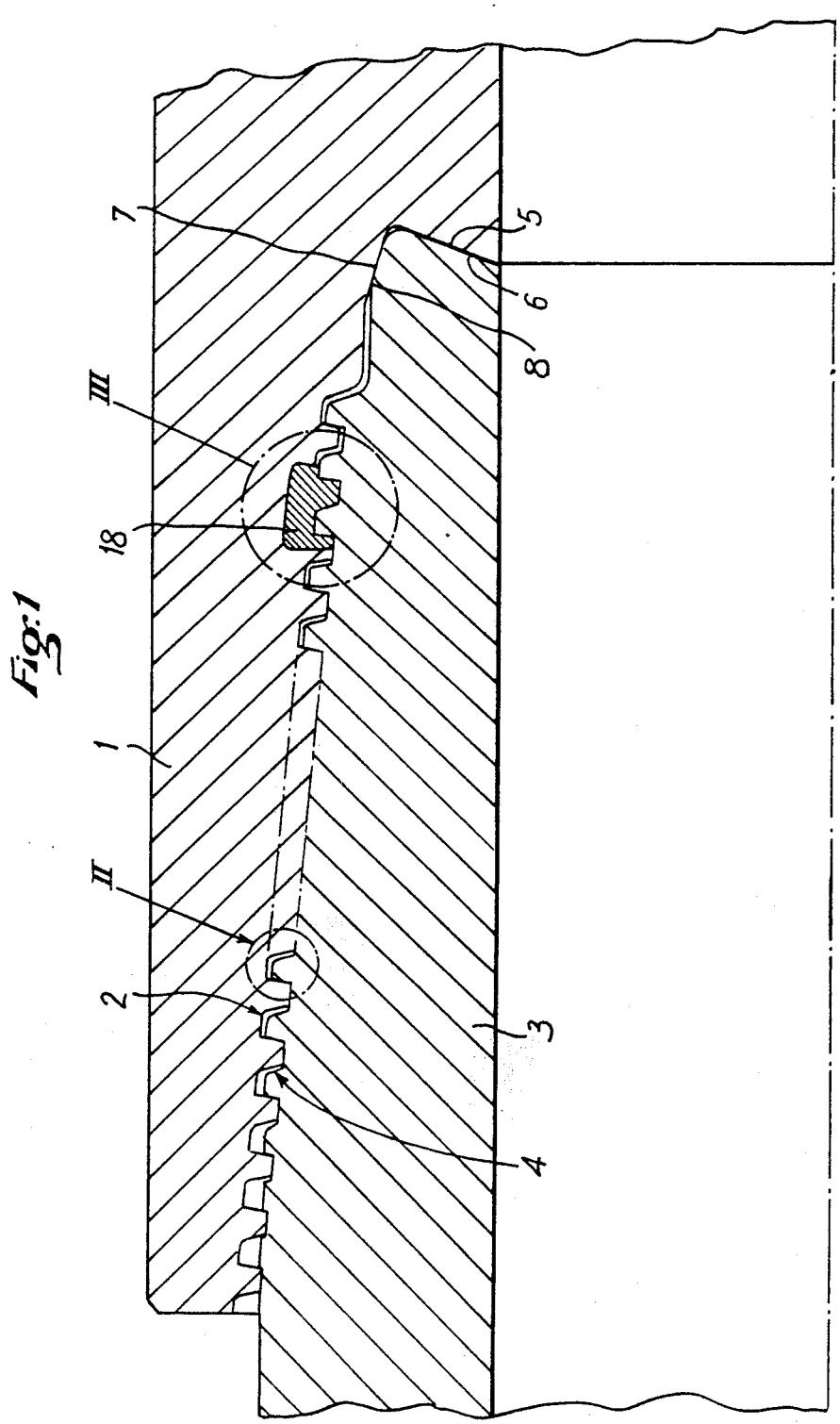
FIG. 1 depicts a cross section of a joint whose female element is equipped with a groove and synthetic lining according to the invention.

In FIG. 1 a half-cross section of a joint according to the invention is shown.

This joint consists of a female element, or sleeve 1 which contains an internal conical threading 2 in which the male element 3 is engaged by a corresponding external conical threading 4.

A stop 5 arranged within the female element serves to support the end 6 of the male element to limit tightening, whereas a pair of surfaces 7 and 8 arranged respectively on the female element and male element ensure tightness of the joint of the metal-metal type.

One sees in FIG. 2 how thread 9 of male element 3 is engaged in a recess 10 of female element 1. Considering the existence of the screw stop 5 and the conicity of the threadings, the side 11 of thread 9 is strongly applied axially against the side 12 of recess 10. Moreover, the bottom of thread 13 of male element 3 is strongly applied radially against the top of thread 14 of the female element.

In the version shown it is the tops of the female threadings that are supported against the hollows of the male threadings, but this could be opposite, if during machining one made the height of the threads 9 greater than that of the recesses 10.

Under these conditions, if one considers the complete periphery of one thread of the male element, one finds that on the bottoms of thread 13 and the sides of thread 11, the female element is applied strongly against the male element which ensure tightness in this zone. On the other hand, at the level of the tops 15 and the back side 16 of thread 9 of the male element there is necessarily a play between the female element and the male element. This play shown at 17 in FIG. 2 means that it hitherto has not been possible to obtain satisfactory sealing at the level of the threadings.

One understands in effect that this play, which is shown in FIG. 2 at the level of one thread, continues helicoidally along the threading between the male element and the female element.

The synthetic lining 18d that is seen in FIG. 1 has the purpose of interrupting this leakage path by completely obstructing this play at the level of at least one thread pitch.

FIG. 3 shows on a larger scale part III of FIG. 1.

One sees in FIG. 3 the groove 18 provided with a synthetic lining 18d. One notes that the bottom of groove 18a which is essentially parallel to the threading, according to the invention is beyond the hollows of the threads of the element that contains the groove. Preferably, the depth of the groove is essentially equal to about twice the height of the threads.

According to a preferred of the invention, the lateral edges 18b and 18c of the groove are inclined to impart to the latter a section in the shape of a dovetail, surfaces 18a, 18b and 18c being connected to each other by flaring.

One sees in FIG. 3 that according to the invention the synthetic lining contained in the groove after tightening occupies the entire free space around the threadings of element 3.

In particular, one sees that the synthetic material is applied continuously over the successive parts 11, 15, 16, 13, etc. of the threading of element 3. As mentioned before the width of the groove and the synthetic lining is greater than one thread pitch in order to be certain that the helicoidal leakage channel is obstructed.

According to the invention the inside periphery of the synthetic lining in groove 18 must be such that it leaves no play between itself and the threading of the other element, even when the threading of this other element is made with minimal dimensions which account for machining tolerances.

According to this invention, it is preferable that, whatever the exact dimensions of the element that is tightened in the element containing the groove and the synthetic lining (these variations in dimensions can be due to machining tolerances), a slight compression is exerted between the synthetic lining and the threading of the other element.

In this fashion one obtains tightness at the level of the threadings which is of good quality and remains reliable, even after numerous tightenings and loosenings of the joint with interchanging of elements.

This sealing according to the invention can naturally be used alone or in succession with other sealings, such as metal-metal sealing, which is obtained on surfaces 7 and 8 of the joint shown in FIG. 1.

FIG. 4 shows a device that permits use of processes that produce a synthetic lining according to the invention.

This FIG. 4 shows the same female element 1 as in FIG. 1.

A mandrel 19 which is screwed into the female element 1 contains an external truncated threading whose shape corresponds to the minimal possible dimensions for the other metal element, considering the machining tolerances of threading. In the case where on wishes to systematically obtain a slight compression of the synthetic material in groove 18, the dimensions of mandrel 19 are slightly less than the minimal dimensions permitted by the manufacturing tolerances of the joint threading.

The mandrel 19 contains a series of longitudinal channels 20 perforated on its periphery, which are connected by radial channels 21 to the space of groove 18.

To produce the synthetic lining, after having applied an antiadhesive product to the corresponding surface of the threadings of mandrel 19, one screws the latter into the female element 1 and then injects the synthetic material through the channels 20 to line the space of groove 18.

After polymerization of the synthetic material one loosens the mandrel and obtains the synthetic lining according to the invention, which will impart perfect tightness and repeated tightness at the level of the threadings, when any male element is screwed into female element 1.

According to another manufacturing process one applies in groove 18 a sufficient amount of synthetic material which is polymerized whereupon after the synthetic material is hard enough, one carries out mechanical machining to impart the profile of the threading of the male element with dimensions corresponding to that which was discussed previously.

The plastic material used is a compound of urethane such as is known under the name "Polathane XPE."

It is understood that the versions that have been described above are not limiting and any desirable modifications could be made without departing from the scope of the invention.

In particular, it is obvious that, although in the versions described it is the female element that is provided with the groove containing the synthetic material, it is also possible to make a groove containing synthetic material on the male element.

It also goes without saying that the groove can be positioned at different sites of the threading and that one could even provide to grooves lined with a synthetic material according to the invention.

Finally, it is obvious that the sealing device according to the invention can be used alone or associated with other sealing devices, for example of the metal-metal type, and that the joints to which the invention applies can contain screw stops or not.

Moreover, the invention can be applied to joints whose threadings are truncated or to joints whose threadings are cylindrical.

Finally, it would be possible to make a groove on the female element and a groove on the male element, these two grooves corresponding so that sealing is achieved at the level of the two synthetic linings.

We claim:

1. A threaded joint for steep pipes usable in particular in the oil industry comprising a male element and a female element connected by threadings on each element, one part of the surface of the threading of one element being strongly applied in the made up condition onto the threadings of the other element, at least one of said elements of the joint comprising over an axial distance corresponding to at least one thread pitch, at least one groove having a depth greater than the height of the threads, said groove containing a sealing, synthetic lining adhering only to said element, the volume and shape of which corresponds substantially to the volume and shape of the clearance that would exist in the made up condition of the joint between the element comprising the groove and the other element of the joint, the dimensions of which would be at the limit of the machining tolerances allowing the greatest possible clearance between the two elements of the joint in front of the grooves in the made up condition, so that the synthetic lining will not be subjected to any substantial permanent deformation during successive tightenings, said lining being applied prior to make up.

2. A process for producing a lining in a joint according to claim 1, said process comprising:

screwing onto the male element of the joint containing the groove, a mandrel comprising a threading the dimensions of which correspond substantially to the limit of tolerances of the female joint element that must be screwed onto the element for obtaining the largest possible clearance between the two elements, and injecting through channels disposed in the mandrel at the level of the groove the synthetic material which adheres to the inside of the groove after polymerization for constituting the synthetic lining.

3. A process for producing a joint according to claim 1 comprising:

applying in the groove in one of said elements a sufficient mass of crude synthetic material to completely fill the groove and area corresponding to the threads;

inducing polymerization of the synthetic material; and machining the polymerized synthetic material in order to impart to it a shape which considering the compression desired to be achieved in the synthetic material, corresponds to the shape of the threading of the other element whose dimensions correspond to the minimal manufacturing tolerances.

4. A process for producing a lining in a joint according to claim 1, said process comprising:

screwing into the female element of the joint containing the groove, a mandrel comprising a threading the dimensions of which correspond substantially to the limit of tolerances of the male joint element that must be screwed into the female element for obtaining the largest possible clearance between the two elements, and injecting through channels disposed in the mandrel at the level of the groove the synthetic material which adheres to the inside of the groove after polyermization for constituting the synthetic lining.

5. A threaded joint according to claim 1, in which the dimensions of the synthetic lining slightly exceed the dimensions corresponding to the limit of machining tolerances which permits the greatest possible play of the joint in the installed condition.

6. A threaded joint according to any of claims 1 or 5, in which the groove has a cross section in the shape of a dovetail.

7. A threaded joint according to any of claims 1 or 5, in which the synthetic lining adheres to the surface of the corresponding groove.

8. A joint according to any of claims 1 or 5 comprising a single groove containing a lining located on the threading of the female element in the vicinity of the end of the male element.

9. A joint according to any of claims 1 or 5 in which the synthetic lining is a urethane elastomer such as polathane XPE or RIM 160 with microcellular structure, polycarbonates, polyolefins or polyamides.

* * * * *

UNITED STATES PATENT AND TRADEMARK OFFICE
CERTIFICATE OF CORRECTION

PATENT NO. : 4,828,294
DATED : May 9, 1989
INVENTOR(S) : Paul Bounie and Bernard Plaquin It is certified that error appears in the above-identified patent and that said Letters Patent is hereby corrected as shown below:

Col. 6, line 53, please delete "steep" and insert therefor -- steel --.

Signed and Sealed this

Thirtieth Day of January, 1990

Attest:

JEFFREY M. SAMUELS

*Attesting Officer*   *Acting Commissioner of Patents and Trademarks*